US009001180B2

(12) United States Patent (10) Patent No.: US 9,001,180 B2
Calman et al. (45) Date of Patent: Apr. 7, 2015

(54) MULTIPLE-PARTICIPANT CUSTOMER SERVICE CONFERENCE

(71) Applicant: Bank of America Corporation, Charlotte, NC (US)

(72) Inventors: Matthew A. Calman, Charlotte, NC (US); Elizabeth S. Votaw, Potomac, MD (US); Alicia C. Jones, Fort Mill, SC (US); Su Liu, Pittsburgh, PA (US); Lynn Streja, Pittsburgh, PA (US); Nir Rachmel, Brookline, MA (US); Wanwen Han, Jersey City, NJ (US); Rajat Agrawal, Sunnyvale, CA (US); Cameron Jungeun Park-Hur, Castro Valley, CA (US); James Robert Grimsley, Dover, FL (US)

(73) Assignee: Bank of America Corporation, Charlotte, NC (US)

( * ) Notice: Subject to any disclaimer, the term of this patent is extended or adjusted under 35 U.S.C. 154(b) by 101 days.

(21) Appl. No.: 13/652,326

(22) Filed: Oct. 15, 2012

(65) Prior Publication Data

US 2014/0104372 A1    Apr. 17, 2014

(51) Int. Cl.
*H04N 7/15* (2006.01)
(52) U.S. Cl.
CPC .................................. *H04N 7/15* (2013.01)

(58) Field of Classification Search
CPC ......... H04N 7/14; H04N 7/141; H04N 7/142; H04N 7/143; H04N 7/147; H04N 7/148; H04N 7/15
USPC ............................................ 348/14.01–14.16
See application file for complete search history.

(56) References Cited

U.S. PATENT DOCUMENTS

| 2004/0203677 | A1* | 10/2004 | Brown et al. .................. 455/416 |
| 2009/0089683 | A1* | 4/2009 | Thapa ............................ 715/756 |
| 2010/0066805 | A1 | 3/2010 | Tucker et al. |
| 2011/0261947 | A1* | 10/2011 | Benefield et al. ......... 379/265.09 |
| 2011/0271209 | A1* | 11/2011 | Jones et al. .................... 715/753 |
| 2012/0206561 | A1* | 8/2012 | Huang ........................ 348/14.09 |
| 2012/0300014 | A1* | 11/2012 | Krantz ........................ 348/14.08 |

* cited by examiner

*Primary Examiner* — Melur Ramakrishnaiah
(74) *Attorney, Agent, or Firm* — Michael A. Springs; Moore & Van Allen PLLC; W. Kevin Ransom

(57) ABSTRACT

Embodiments of the invention are directed to systems, methods and computer program products for receiving input to initiate a video conference with a first participant from a user; initiating the video conference between the user and the first participant; receiving a request to add at least a second participant to the video conference from at least one of the user and the first participant, the request comprising credentials associated with the second participant; determining that the second participant is authorized to join the video conference based on the credentials; and connecting the second participant to the video conference.

14 Claims, 10 Drawing Sheets

MULTIPLE-PARTICIPANT CUSTOMER SERVICE CONFERENCE

BACKGROUND

In some circumstances, customers of financial institution may desire a personal and convenient business solution over non-interactive solutions. For example, customers may prefer to go into an office or a store to talk to a representative in person rather than interacting with a machine. However, some customers may be unwilling or unable to visit a store when an issue arises due to various constraints such as the inconvenience of physically traveling to a store and scheduling conflicts.

BRIEF SUMMARY

The embodiments provided herein are directed to a system for initiating a multiple-participant video conference. The system includes a computer apparatus including a processor and a memory; and a conference software module stored in the memory, comprising executable instructions that when executed by the processor cause the processor to: receive input to initiate a video conference with a first participant from a user; initiate the video conference between the user and the first participant; receive a request to add at least a second participant to the video conference from at least one of the user and the first participant, the request comprising credentials associated with the second participant; determine that the second participant is authorized to join the video conference based on the credentials; and connect the second participant to the video conference. In some embodiments, the credentials comprise at least one of a security code, an identifier of the second participant, an identifier associated with the device of the second participant that is in communication with the system, the geographical location of the second participant, and an area of expertise of the second participant.

In some embodiments of the system, the module is further configured to: identify the second participant based on the credentials; match the second participant to a participant on a list of authorized participants. The module is further configured to: determine that the geographical location of the second participant is within a predetermined distance of the geographical location of the device of the user. The module is further configured to: provide, on a display of the device of the user that is in communication with the system, a list of suggested subjects to the user; receive the subject of interest to the user selected from the list of suggested subjects; provide, on the display of the device, a list of one or more experts on a subject of interest to the user, wherein the first participant comprises an expert selected from the list of one or more experts.

In some embodiments of the system, the request further comprises a second topic of interest to the user and wherein the module is further configured to: identify the second participant based on the second subject of interest to the user, wherein the second participant comprises an expert on the second subject of interest to the user.

In some embodiments, the module is further configured to: The system of claim 1, wherein the module is further configured to: identify the second participant based on the credentials; send an invitation to join the video conference to the second participant; and receive input from the second participant, wherein the second participant is connected to the video conference in response to receiving the input from the second participant. The module is further configured to: prompt the user to confirm that the second participant is authorized to join the video conference; and receive confirmation from the user, wherein the second participant is connected to the video conference in response to receiving the confirmation from the user.

In some embodiments, the module is further configured to: determine that the user has been disconnected from the video conference, automatically terminate the video conference call for all participants, and/or prompt the first participant to cease communications with the second participant until the user has been reconnected to the video conference. In other embodiments, the second participant comprises at least one of an expert on a second subject of interest to the user, a family member of the user, a joint account holder of the user, a financial planner, and an agent of the user. In still other embodiments, the module is further configured to: receive video data and audio data associated with the video conference from the user; and identify an unauthorized third participant to the video conference based on the video data or audio data; and terminate the video conference in response to identifying the unauthorized third participant.

Further embodiments provided herein are directed to a computer program product for initiating a multiple-participant video conference, the computer program product comprising: a computer readable storage medium having computer readable program code embodied therewith, the computer readable program code comprising: a computer readable program code configured to receive input to initiate a video conference with a first participant from a user; a computer readable program code configured to initiate the video conference between the user and the first participant; a computer readable program code configured to receive a request to add at least a second participant to the video conference from at least one of the user and the first participant, the request comprising credentials associated with the second participant; a computer readable program code configured to determine that the second participant is authorized to join the video conference based on the credentials; and a computer readable program code configured to connect the second participant to the video conference.

In some embodiments of the computer program product, the credentials comprise at least one of a security code, an identifier of the second participant, an identifier associated with the device of the second participant, the geographical location of the second participant, and an area of expertise of the second participant. The computer program product further includes computer readable program code configured to: provide, on the display of the device, a list of suggested subjects to the user; receive the subject of interest to the user selected from the list of suggested subjects; provide, on the display of the device, a list of one or more experts on a subject of interest to the user, wherein the first participant comprises an expert selected from the list of one or more experts.

In some embodiments of the computer program product further includes computer readable program code configured to: prompt the user to confirm that the second participant is authorized to join the video conference; and receive confirmation from the user, wherein the second participant is connected to the video conference in response to receiving the confirmation from the user.

Also provided herein is a computer implemented method for initiating a multiple-participant video conference, the method being performed by a computer processor, wherein the computer processor operates on specifically configured computer program code that cause the processor to perform the operations of: receiving input to initiate a video conference with a first participant from a user; initiating the video conference between the user and the first participant; receiving a request to add at least a second participant to the video conference from at least one of the user and the first participant, the request comprising credentials associated with the second participant; determining that the second participant is authorized to join the video conference based on the credentials; and connecting the second participant to the video conference. In some embodiments of the method, the credentials comprise at least one of a security code, an identifier of the second participant, an identifier associated with the device of the second participant, the geographical location of the second participant, and an area of expertise of the second participant. In still other embodiments, the specifically configured computer program code cause the processor to perform the operations of providing, on a display of the device of the user, a list of suggested subjects to the user; receiving the subject of interest to the user selected from the list of suggested subjects; providing, on the display of the device, a list of one or more experts on a subject of interest to the user, wherein the first participant comprises an expert selected from the list of one or more experts.

BRIEF DESCRIPTION OF THE DRAWINGS

Figure 1:
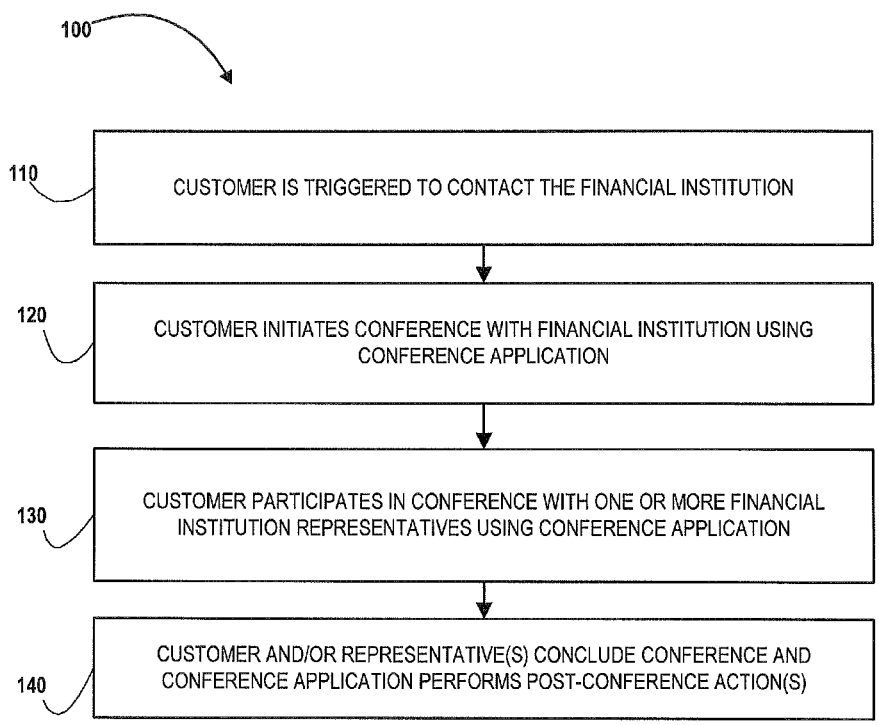
Figure 2:
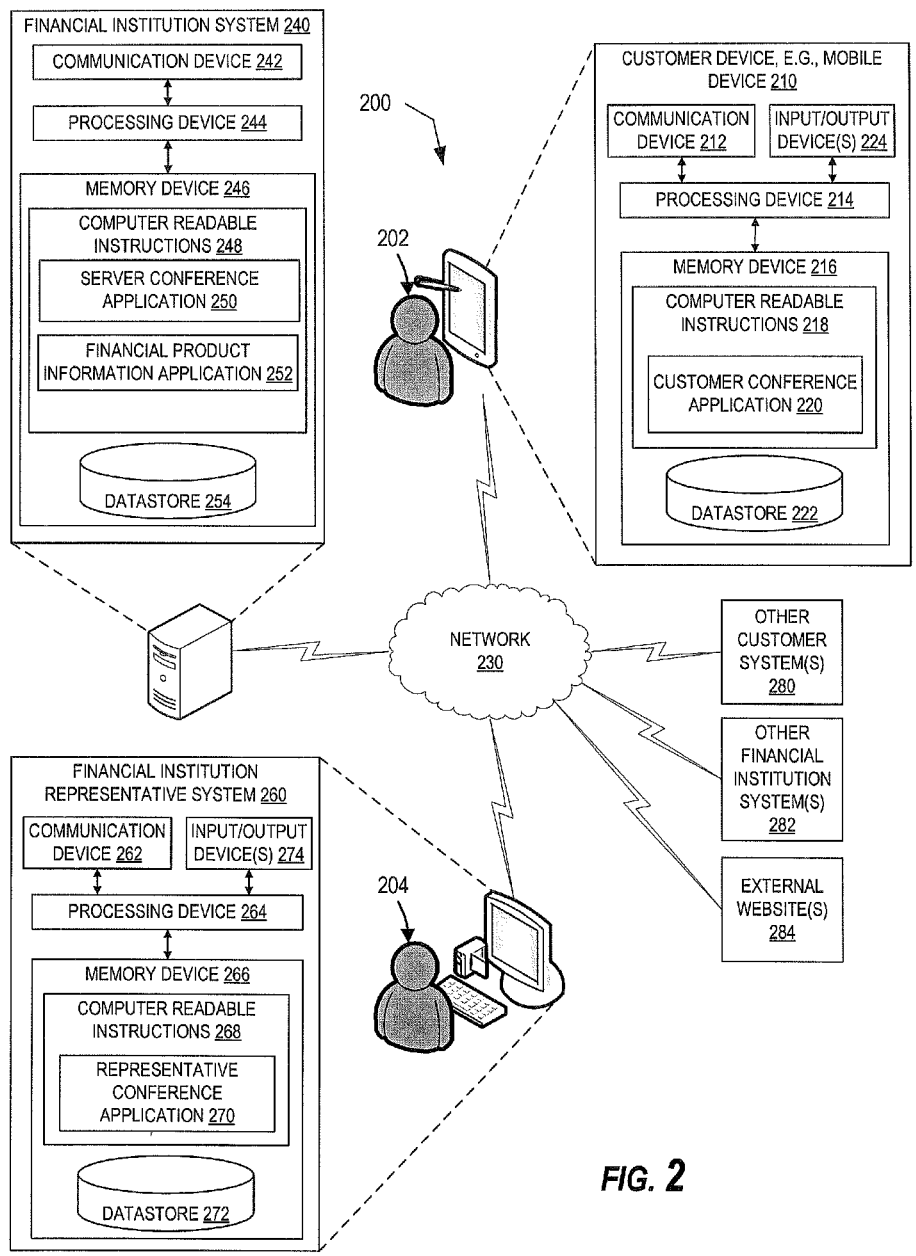
Figure 3A:
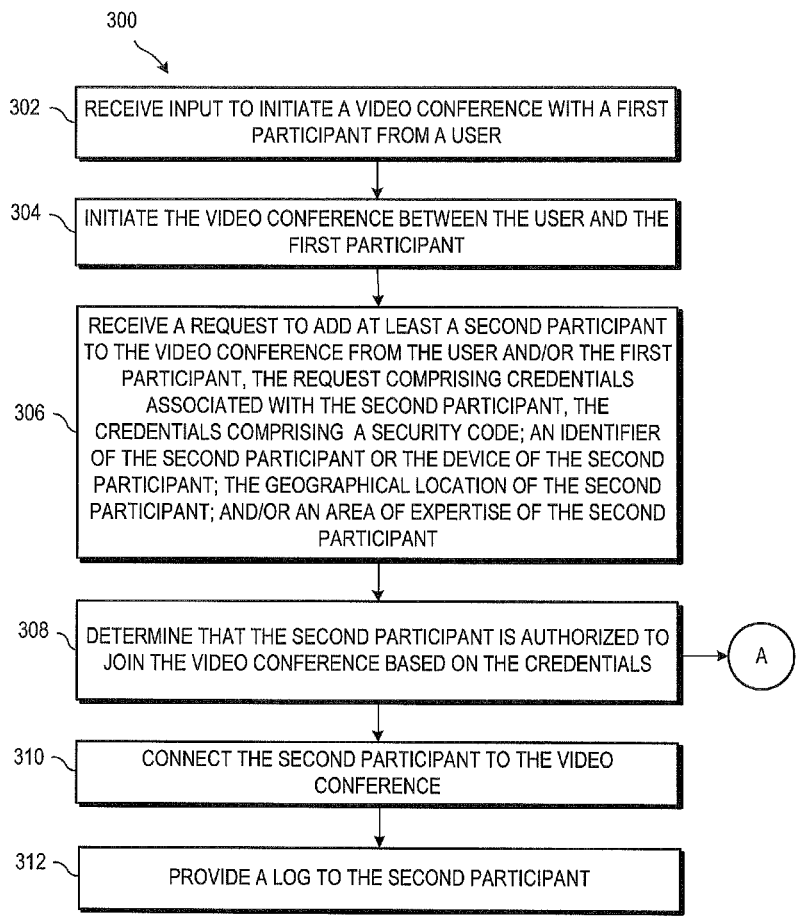
Figure 3B:
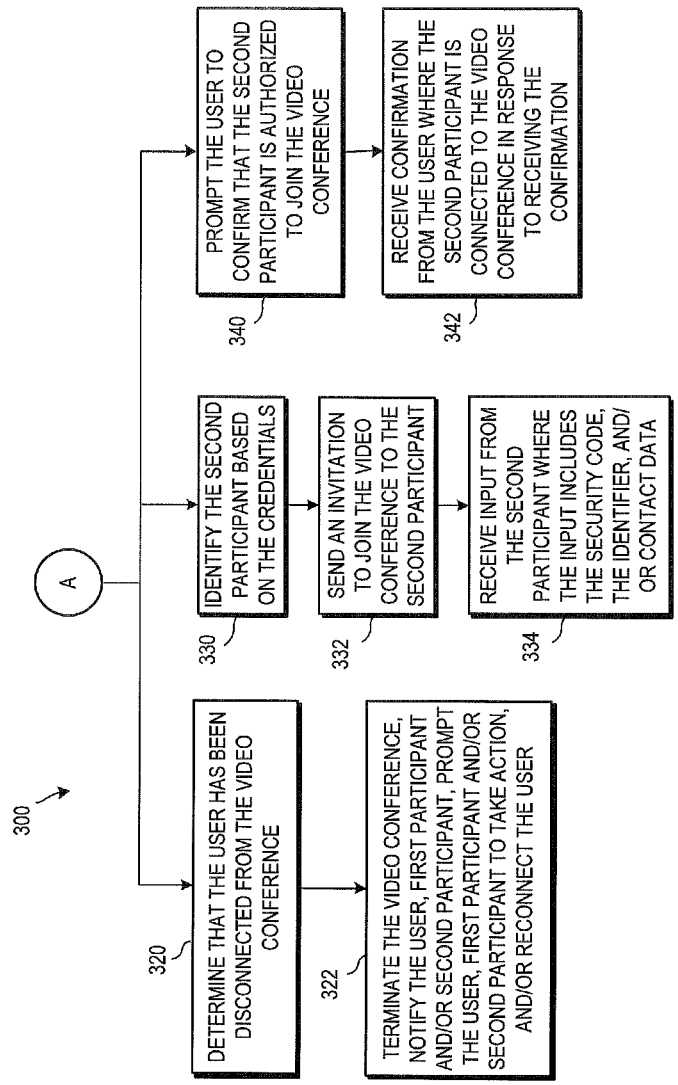
Figure 4:
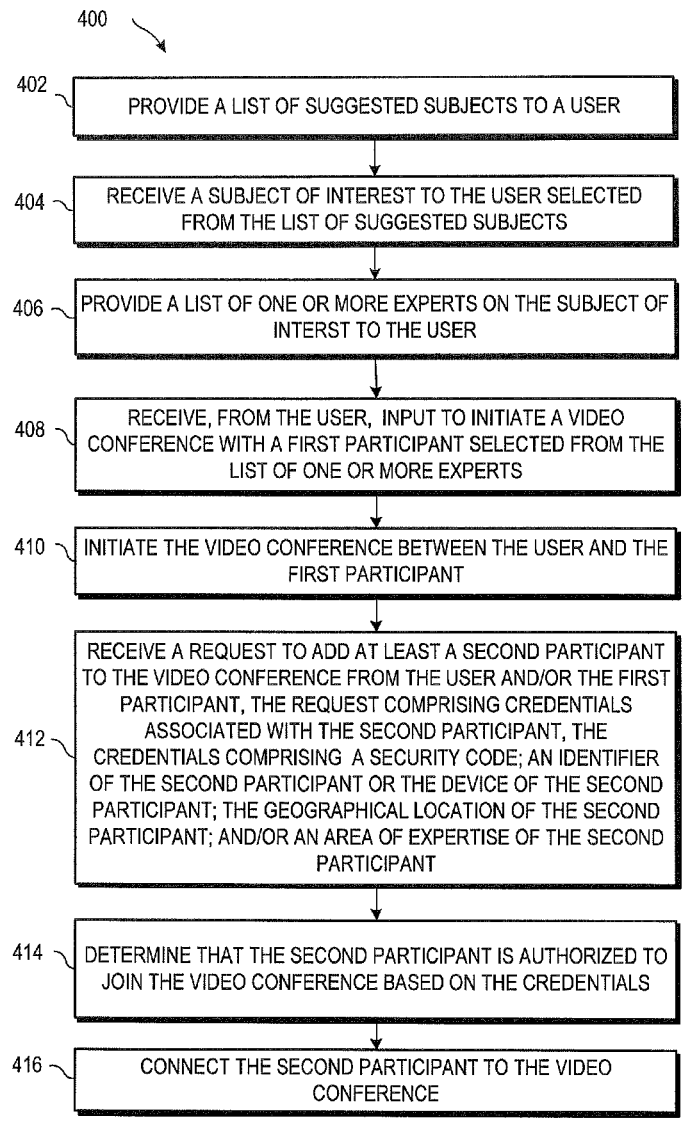
Figure 5:
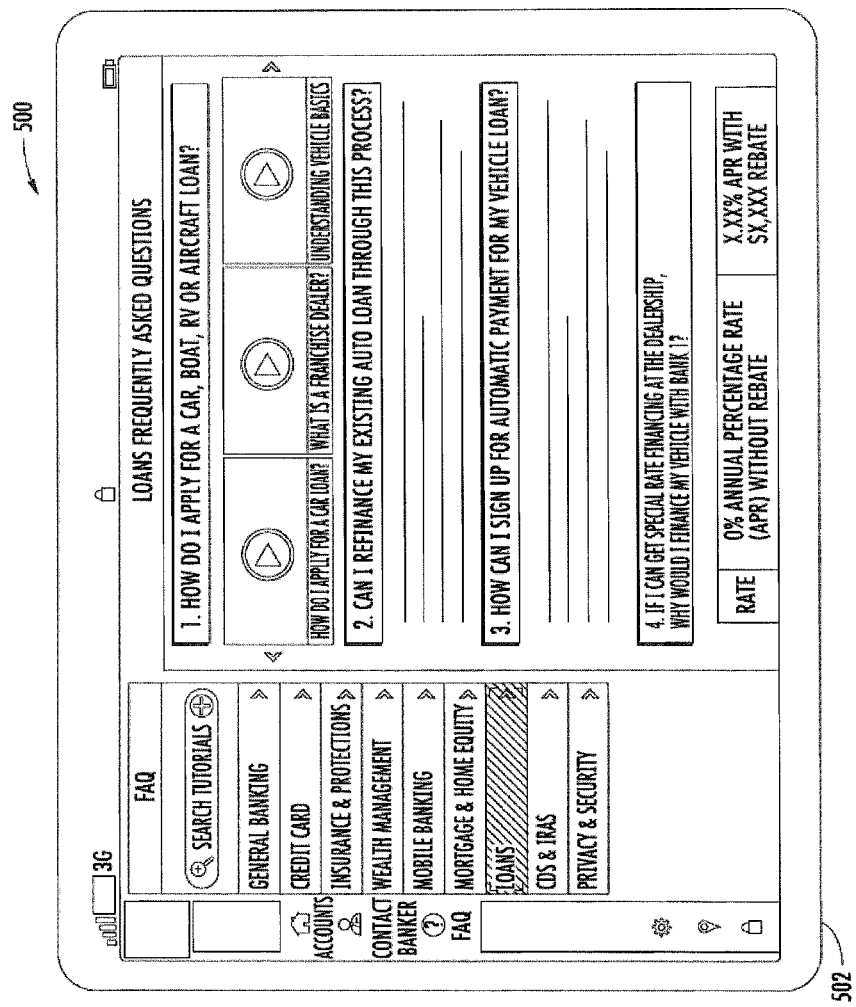
Figure 6:
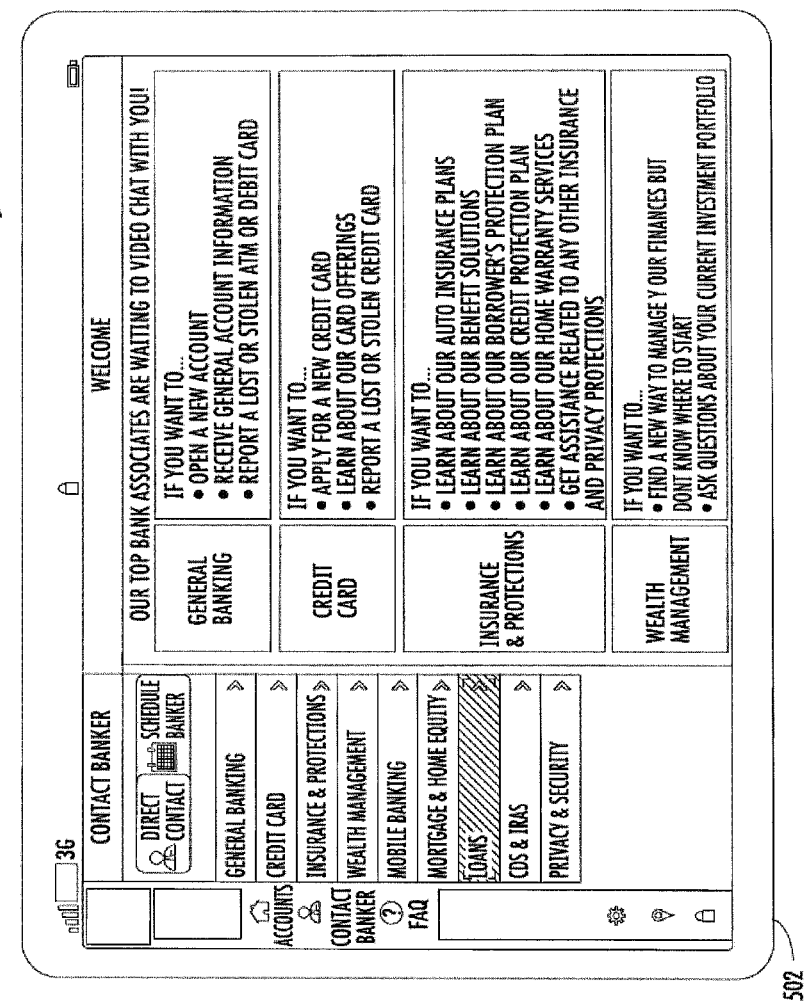
Figure 7:
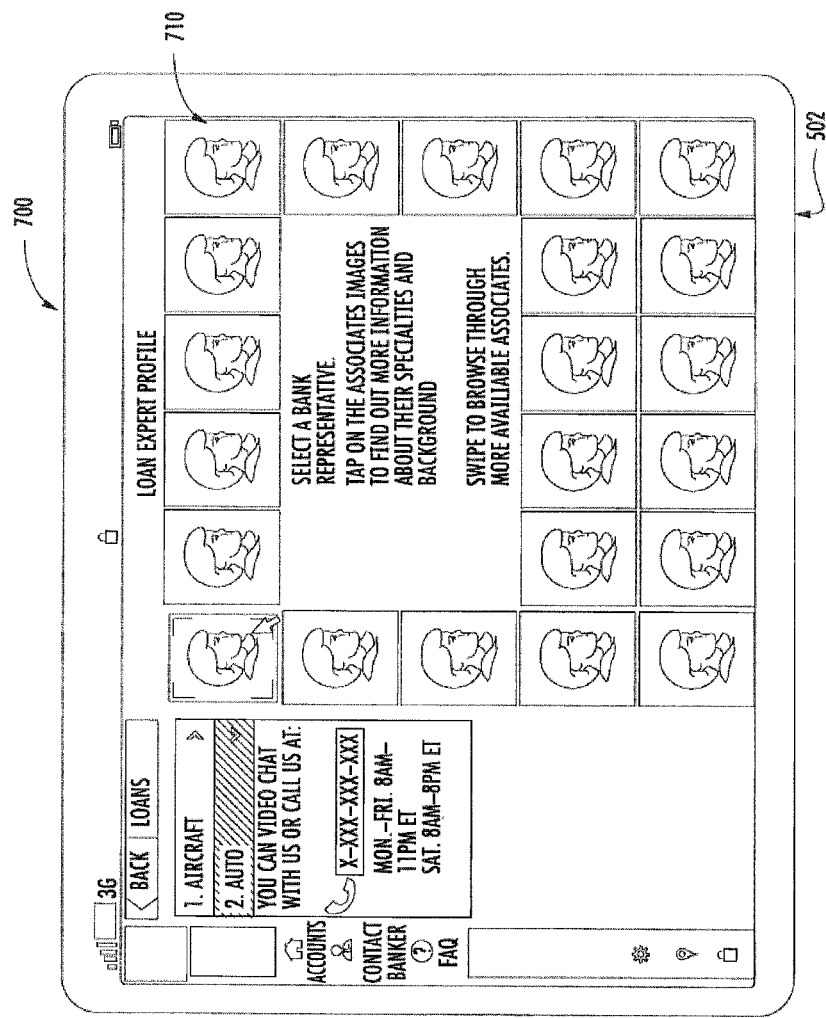
Figure 8:
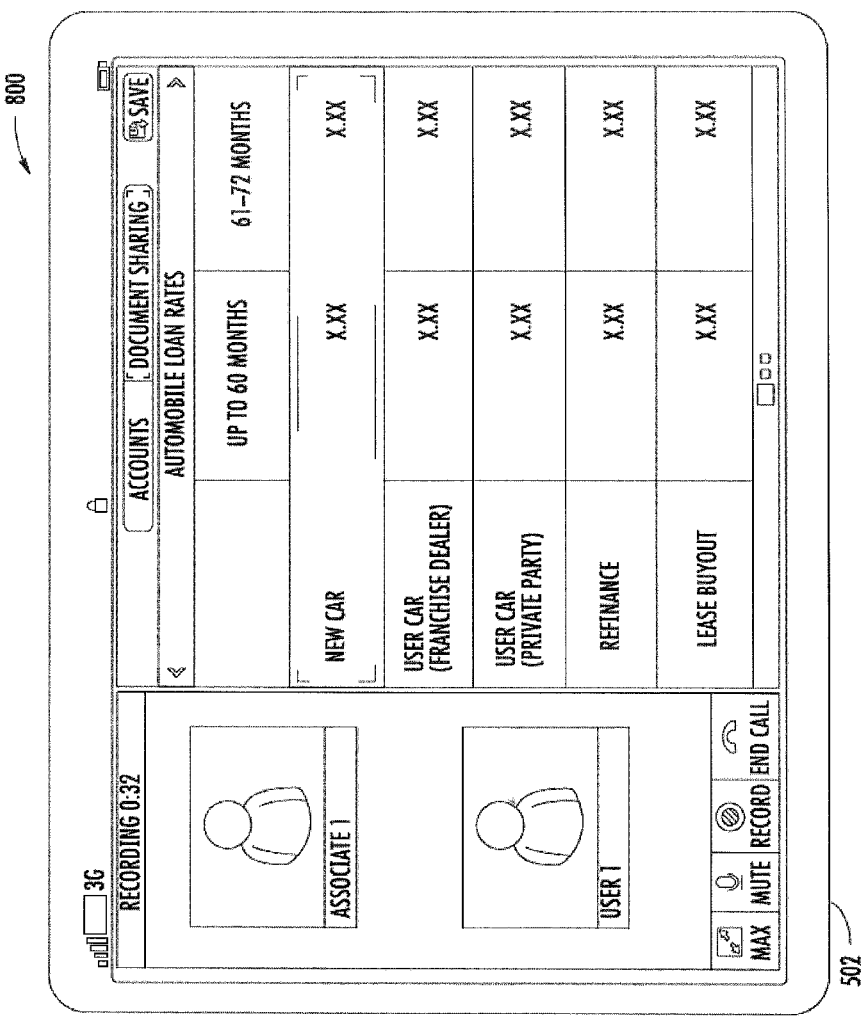
Figure 9:
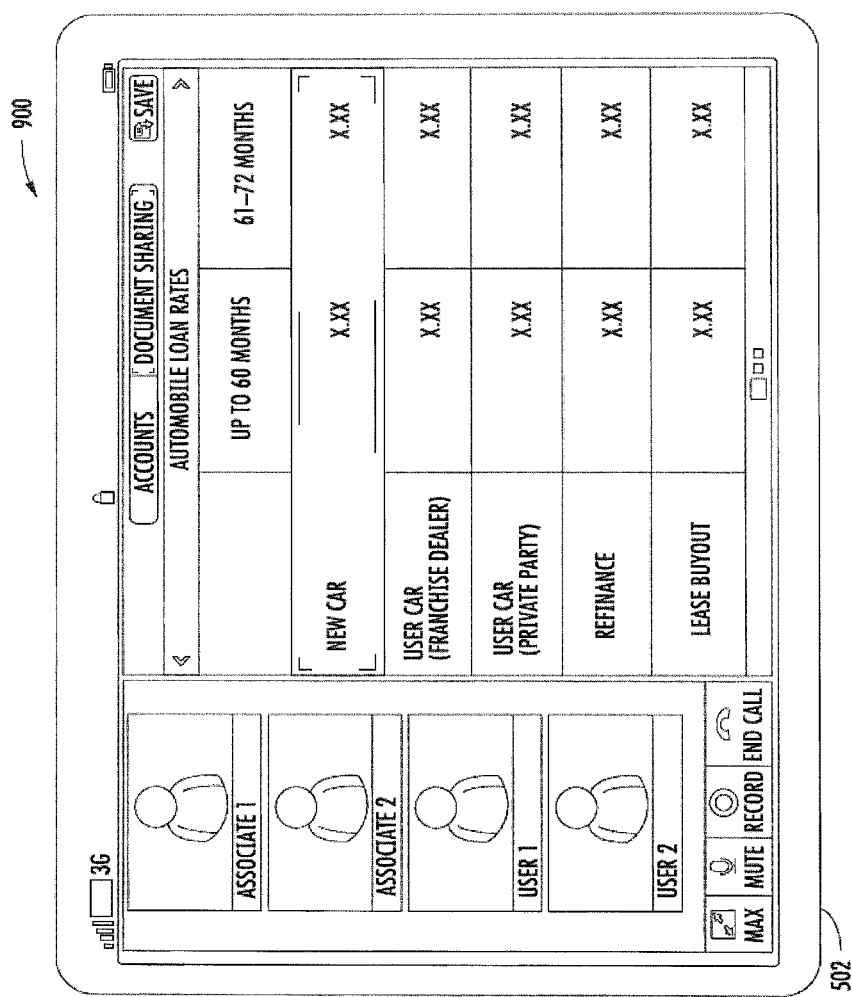

Having thus described embodiments of the invention in general terms, reference will now be made to the accompanying drawings, where:

FIG. 1 is a flowchart illustrating a process flow representing the fundamental stages of a customer's interaction with the financial institution in accordance with various embodiments of the invention;

FIG. 2 is a block diagram of illustrating a system and environment a customer service conference in accordance with various embodiments of the invention;

FIGS. 3A-3B are flowcharts illustrating a system and method for multiple-participant video conferencing in accordance with various embodiments of the invention;

FIG. 4 is a flowchart illustrating a system and method for multiple-participant video conferencing in accordance with various embodiments of the invention;

FIGS. 5-7 are exemplary graphical user interfaces of a mobile device illustrating a process of setting up a multiple-participant video conference in accordance with various embodiments of the invention; and FIGS. 8-9 are exemplary graphical user interfaces of a mobile device illustrating a multiple-participant video conference in accordance with various embodiments of the invention.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention enable customers to interact with financial institution representatives over video conferencing and/or audio conferencing using a conferencing application running on, for example, a financial institution server and/or the customer's notebook computer. The variety of features may provide a customer an unprecedented balance of convenience, personalization, and exceptional customer service. Before or at the beginning of a call, a customer is given a set of representatives. The customer may select a representative based on information provided about the representatives such as their numbers of years of experience. While the customer is waiting for the call to commence, the customer may be provided information indicating the wait time until the call commences and may be given relevant information or links to information using the conference application, such as by a split screen showing relevant information as well as hold time information. In some cases, the customer is given an opportunity to play games or navigate the Internet for topics unrelated to the topic of the call. Once on a call, customers are given an opportunity to view and edit documents related to the call. In some instances, customers may collaborate on document creation and modification with the representative and the representative (or customer) may be able to point out sections of relevant documents to the customer such as by highlighting or inserting notes. The conferencing application may also generate an electronic call summary that may be specialized for the representative or the customer. This call summary may record the spoken words and convert them to text and correlate the text with the other interactions between the customer and the representative, for example, noting within the call log that the representative presented the customer with a specific document at a particular point in the conversation. The conferencing application may enable a customer to schedule a future conference with a representative with whom the customer has previously interacted (referred to as a "primary representative") or with a representative recommended by the primary representative. In some situations it may be advantageous for the conference to switch devices and/or include additional participants, so the conference application provides the customer flexibility in forwarding the call to other devices or back to the original device and/or inviting other participants onto the call.

Referring now to FIG. 1, a flowchart illustrates a process flow 100 representing the fundamental stages of a customer's interaction with the financial institution. These stages were discerned through a significant customer research project. The first stage of customer interaction, at Block 110, is the customer is triggered to contact the financial institution. Typically, the customer has a question about a financial product such as a product the customer is considering or a product the customer already owns. Whatever triggers the customer to initiate contact with the financial institution provides context for the conference regarding subject matter and may also provide the environment and circumstances surrounding the customer. Accordingly, various embodiments of the conferencing application were designed to address the needs and concerns of those customers who initiate conferences with the financial institution based on triggers. In order to maximize the customer experience and satisfaction with the conference application, and based in part on the triggers to the customer, the conference application, in some embodiments, ensures that the customer can make a personal connection with one or more financial institution representatives who may be able to provide expert advice to the customer regarding complex products or issues over a private and secure platform that overcomes common challenges to existing video technologies.

The next stage of customer interaction, at Block 120, is the customer initiating a conference with the financial institution using the conference application. The customer, having been triggered by an interest in a product or a question about a product or otherwise, may want to speak with a customer service representative. The customer, however, may not want to take the time to physically visit a brick and mortar financial institution location. The conference application provides an alternative to visiting a physical location along with numerous advantages to doing so such as the ability to electronically create and edit documents in collaboration with a representative.

In order to initiate a conference, a customer may use a customer device such as a computing device like a computer (desktop, laptop, tablet or the like), a smartphone or other computing device as represented by computing device 210 of FIG. 2. The computing device may have a conference application installed in its memory. The conference application may also be installed and running on one or more financial institution servers such that customers running the conference application on a customer device can communicate with the conference application running at the financial institution. The conference application for the customer device may be the same or different than the conference application running on the financial institution servers.

The conference application provides the customer an opportunity to select a representative with whom to speak in some embodiments. Several representatives may be presented to the customer in a list of representatives. In some embodiments, each of the representatives are presented by display of a still, moving, and/or live picture of the representative as well as some information about the representative. In some cases, the representative's professional qualifications and experience are presented to the customer for consideration, and in some cases, additional information about the representative is presented. For example, personal interest information may be presented, for example, the representative's hobbies, location, and favorite sports teams or favorite television shows may be presented to the customer for consideration. Once the customer has selected a representative to speak with, the application places the customer "on hold" for an immediate conversation with the representative or may present the customer with a date and time in the future for scheduling a call with the representative. The application may then remind the customer of the scheduled call in a variety of ways, such as using electronic calendar entries, alarms and the like. Either prior to an immediate call or a scheduled call, the customer may input some pre-call information to provide context for the call with the representative.

In some cases, such as for a premier customer, the application may provide all of the financial institution representatives assigned to the customer or with whom the customer has previously spoken. For example, the loan officer, the financial planner, the personal banker and the like associated with the customer may be provided to the customer for selection during the pre-conference representative selection. The application may also rank the representatives (either or both of assigned representatives and representatives previously spoken with) based on customer input, experience in relevant field or otherwise.

While the customer is on hold waiting for a conference call, the customer may be presented with one or more time consuming options while holding. The customer may be presented with information regarding the customer's wait until the connection with a live representative is made, such as a visual depiction of the queue of customers waiting for customer service related to, for example, a specific category of assistance or a specific representative. The visual depiction may also include information related to the time to connection and may include a "snooze" virtual button or other virtual input mechanism that receives customer input indicating the customer's desire to postpone the live connection with the representative. During the hold, the customer may be presented with informational videos relevant to the upcoming call. In some instances, the videos may be recordings of the representative for whom the customer is waiting or another representative familiar to the customer. Similarly, the customer may be presented with a widget or a portion of the application screen, such as a portion of a split screen for performing onsite research or offsite research, providing games to play while waiting, providing a data consumption bar during the hold as well as during the call, providing choices for connection speed (and possibly quality of video/audio, providing a listing of documents necessary and/or useful for the call and the like. In some instances, a widget or split screen portion is provides access to the financial institution's online banking platform so that the customer may access information regarding his or her accounts maintained by the financial institution.

Referring again to FIG. 1, the next stage of customer interaction, at Block 130, is the customer participates in a conference with one or more financial institution representatives using the conference application. During the conference, the customer may be provided with various functions for improving the conference experience, for example, document sharing, visual navigation, video chat and call controls and multiple participants.

The application may present to the customer persistent call controls, such as for accessing an on demand customer service connection or other representative connection. An interface of the application may provide the customer an opportunity to highlight or select portions of text or graphics presented on the interface, such as highlighting portions of documents that are being discussed between the customer and the representative. The control of these shared documents may be retained by the representative or may be with the customer or both. The representative may direct the discussion away from a standard document to something more interactive such that the customer may have the ability to access portions of the document and enter/change information in the document. In some instances, the application may allow the customer and the representative to switch control of the document back and forth as necessary during the conference.

During a conference, a customer and/or a representative may need to bring one or more other people into the conference. This may be done by the customer, for example, by the customer vouching for the additional participant and, in some embodiments, verifying the additional participant electronically. In some cases, credentialing of the additional participant is by a verification process. When an additional representative is required on the conference, an interaction log may be provided to the new associate to bring him or her up to speed quickly. The customer may have a trusted group of representatives who may be quickly brought into a conference. If the customer has not interacted with a particular representative before, the customer may provide a confirmation of acceptance of a representative, based on pre-existing filters, review of provided representative information or the like.

In some embodiments, during a conference using the application, a customer is given an opportunity to promote and/or demote levels of connectivity. For example, the customer may choose to change from textual to audible to visual to audiovisual interaction with the financial institution representative and/or the opposite. Such channel hopping may be logged, such as in an interaction log. Also, the customer may auto-forward a connection initiated from a representative from one device to another device, such as from the customer's tablet computer to a smartphone. In some cases, the customer may forward the connection back to the original device or use a cross- and/or dual-channel presentation. For example, audio of the conference may be presented using one device and video may be presented using another device.

At Block 140, the customer and/or the representative concludes the conference and the conference application may perform one or more post-conference actions. For example, an e-receipt (also called an interaction log) may be finalized. The interaction log may created automatically by the application during the conference and my include a recording and/or a textual representation of the words spoken during the conference. The interaction log may but used by the customer and/or the representative as a record of the call and the information/document shared during the call. From the perspective of the customer, the log may be used as a reference when completing tasks after the call has ended such as gathering or completing additional documents or following up as necessary. In addition to voice recordings and written text, the log may include, for example, copies of documents discussed, links to other information, highlighting and or notes taken during the call, and possibly timestamps indicating when in the call various actions occurred or documents were reviewed/highlighted and the like. The log may incorporate manual input as well. For example, the log may accept confirmation of portions of a conversation from one or both participants. In some instances, one or both participants may be able to remove unnecessary or repetitive portions of the log as desired. The log may include inset indications of highlighting of interface items and/or documents discussed during the conference. The participants of the conference may have different versions of the log, such as versions allowing the customer to comment/edit within the log manual and versions allowing the representative to comment/edit within the log manually.

In some embodiments, after the call has been completed archives of the interaction log and any documents discussed, created, edited or otherwise are stored by the financial institution and/or by the customer device (for offline access). These documents may be retrieved by the customer, such as by using the application or by logging into the customer's online banking website portal. In some embodiments, the application prompts the customer whether to store one or more of the log and/or the other document(s) discussed and prompts the customer regarding the storage location. In some embodiments, the customer is also given the option of communicating the log and/or other documents to one or more electronic destinations such as to one or more email addresses or the like.

Referring now to FIG. 2, a block diagram illustrates an environment 200 wherein a customer 202 participates in a conference with a financial institution representative 204 using a customer device 210 and a financial institution representative system 260, respectively. The environment also may include a financial institution system 240, other customer systems 280, other financial institution systems 282 and/or external websites 284. The systems and devices communicate with one another over a network 230 and perform one or more of the various steps and/or methods according to embodiments of the invention discussed herein.

A customer device 210 may be configured for use by a customer or other user, for example, to access one or more other financial institution applications such as the customer conference application 220. The customer device 210 may be or include a computer system, server, multiple computer systems, multiple servers, or some other computing device configured for use by a user, such as a desktop, laptop, tablet, or a mobile communications device, such as a smartphone. The mobile device 210 has a communication device 212 communicatively coupled with a processing device 214, which is also communicatively coupled with a memory device 216 and one or more input and/or output devices 224, for example, an image capture device such as camera and/or a microphone. The processing device 214 is configured to control the communication device 212 such that the customer device 210 communicates across the network 230 with one or more other systems, for example, the financial institution representative system 260. The processing device 214 is also configured to access the memory device 216 in order to read the computer readable instructions 218, which in some embodiments include a customer conference application 220. The memory device 216 also may have a datastore 222 or database for storing pieces of data for access by the processing device 214.

The financial institution representative system 260 may be a workstation used by a representative to communicate with customers using the conference application. In some embodiments, the financial institution representative system 260 may communicate with one or more of the other systems or devices and may perform one or more steps and/or one or more methods as described herein. In some embodiments, the financial institution representative system 260 includes a communication device 262 communicatively coupled with a processing device 264, which is also communicatively coupled with a memory device 266 one or more input and/or output devices 274, for example, an image capture device such as camera and/or a microphone. The processing device 264 controls the communication device 262 such that the financial institution representative system 260 communicates across the network 230 with one or more other systems or devices. The processing device 264 is also configured to access the memory device 266 in order to read the computer readable instructions 268, which in some embodiments include a representative conference application 270 having instructions for communicating with the customer conference application 220 running on the customer device 210 and/or the server conference application 250 running on the financial institution system 240. In some embodiments, the financial institution representative system 260 includes one or more datastores 272 for storing and providing one or more pieces of data used by the representative during conferences with customers.

A financial institution system 240 is a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a server conference application 250. The memory device 246 also has a datastore 254 or database for storing pieces of data for access by the processing device 244. In some embodiments, the representative conference application interacts with the server conference application to access information, document or other data for use during a conference call. In some embodiments, a financial product information application 252 retrieves information regarding financial products being discussed during a call between a customer and a representative and provides the information to the customer and/or the representative during the call and/or after the call has ended.

The applications 220, 250 and 270 are for instructing the processing devices 214, 244 and 264 to perform various steps of the methods discussed herein, and/or other steps and/or similar steps. In various embodiments, one or more of the applications 220, 250 and 270 are included in the computer readable instructions stored in a memory device of one or more systems other than the systems 240 and 260 or device 210. For example, in some embodiments, the application 220 is stored and configured for being accessed by a processing device of one or more other customer systems 280 connected with a representative through network 230. In various embodiments, the applications 220, 250 and 270 stored and executed by different systems/devices are different. In some embodiments, the applications 220, 250 and 270 stored and executed by different systems may be similar and may be configured to communicate with one another, and in some embodiments, the applications 220, 250 and 270 may be considered to be working together as a singular application despite being stored and executed on different systems. In some embodiments, the applications 220, 250 and 270 stored and executed by the customer device and/or an application stored and executed on one of the other systems is a stand-alone application 220 and does not necessarily communicate or rely on any other applications for data, processing or otherwise, except for providing a connection with a representative through the application 270.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the financial institution representative system 260, the other financial institution systems 282, and/or any other system or component used in conjunction with or to perform any of the method steps discussed herein.

In various embodiments, the financial institution system 240, the customer device 210, the financial institution representative system 260 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

Referring now to FIGS. 3A-3B, flowcharts illustrating a system and method 300 for initiating a multiple-participant customer service conference is provided. One or more devices, such as one or more mobile devices and/or one or more other computing devices and/or servers, can be configured to perform one or more steps of the method 300 (e.g., the financial institution system 240, the financial institution representative system 260, and the customer device 210 of FIG. 2). In some embodiments, the one or more devices performing the steps are associated with a financial institution. In other embodiments, the one or more devices performing the steps are associated with a business, partner, third party, and/or user.

As illustrated at block 302, input to initiate a video conference with a first participant from a user is received. For example, the user may access a banking application on the user's mobile device to make the input or the user may log into an online banking account web page. Exemplary first participants include a bank representative, a customer service associate, an expert on a particular subject of interest to the user, an account specialist, an agent of the user, an employee of a financial institution, a family member of the user, and/or any other person or entity suggested by the user. In an exemplary embodiment, the first participant comprises an employee of a financial institution and the user comprises a customer of the financial institution. For example, the financial institution may maintain one or more financial accounts associated with the user.

In some embodiments, the first participant comprises a registered participant. The registered participant may be a person that the user has previously interacted with, an employee of a financial institution, another account holder of the financial institution or another customer of the financial institution, a previously authorized participant, a representative selected from a list of suggested representatives, a person associated with the system of method 300, and the like. In other embodiments, data associated with the first participant is stored in a database such that the system of method 300 can match the input with data stored on the database. For example, the input may comprise the name, address, phone number, IP address of the first participant's device, email, or other data that the system of method 300 can use to look up the first participant in the database and verify the first participant's identity. In other examples, the first participant comprises an unregistered participant. In such cases, the user provides information necessary to initiate the video conference with the first participant such as a personal identification code, a telephone number of the first participant, an IP address of the first participant's device, the first participant's account information, and the like. In some embodiments, the system of method 300 sends the first participant an invitation to join the video conference. For example, the system of method 30 may send a text, email, or fax to the first participant with a link to a website, passcodes, and the like for connecting to the video conference.

The user may seek to initiate the video conference with the first participant for any number of reasons. For example, the user may prefer individualized service from personable representatives and may prefer to have a single point of contact. Interacting directly with a person may be preferred because a person is flexible and can provide empathy and reassurance while a machine cannot. Further, the user may initiate the video conference to get expert advice when item compatibility is critical and cannot be assessed remotely, to reduce errors, and to confirm that a transaction was performed correctly. Video conferencing also allows a user to discuss and examine a financial matter in privacy.

As illustrated at block 304, the video conference between the user and the first participant is initiated. In some embodiments, the video conferencing includes point-to-point video conferencing where the device of the user communicates directly with the device of the first participant. In other embodiments, a multipoint conferencing unit (MCU) or bridge is used to initiate the video conference such that all video and audio data from each location is transmitted to the MCU, which then sends out the information out to each location.

As illustrated in block 306, a request to add at least a second participant to the video conference from the user and/or the first participant is received, the request comprising credentials associated with the second participant, the credentials comprising a security code, an identifier of the second participant or the device of the second participant, the geographical location of the second participant, and/or an area of expertise of the second participant. In some embodiments, the identity of the second participant is known to the user and/or first participant. For example, the user may request that his or her spouse be included in the video conference. In other embodiments, the identity of the second participant is not known to the user and/or first participant. For example, the user may need advice on a subject that the first participant is unfamiliar with and may require that the second participant be identified and recommended by the system performing the method 300. In such cases, the request may further include a subject of interest to the user that is the same as or different from the subject that has already been discussed in the video conference, financial data of the user, account data of the user, transaction trends, or any other information that may be used to recommend an additional participant.

In some embodiments, at least some of the credentials are associated with the user and/or first participant. The security code, in some embodiments is associated with the user, first participant, and/or second participant. For example, the system of method 300 may require that the user and/or first participant to input a personal identification number (PIN), password, an answer to a security question, or other security measures in order to add the second participant to the video conference. In another example, the request comprises the PIN, password, employee number, and the like of the second participant.

Exemplary identifiers of the second participant include the name, email address, phone number, user name, social media ID, employee number, and/or government issued identifier of the second participant and the like. The identifiers associated with the device of the second participant include, for example, the internet protocol (IP) address of the device, device SKU numbers, and the like.

The geographical location may be determine based on the address of the second participant and/or transmitted from a global positioning system (GPS) associated with a device of the second user that is in communication with the system of method 300. The geographical location of the second participant may include real time data or static data. In one exemplary embodiment, the system of method 300 determines the geographical location of the second participant based on the video data and/or audio data of the video conference. For example, if the second participant or the second participant's device is positioned such that the second participant is visible in the video screen of the user and/or second participant, or if the second participant is positioned such that the second participant is close enough to a microphone of the user and/or first participant's device, the system of method 300 can determine that the geographical location of the second participant. The user and/or first participant may also manually enter this data. The system of method 300 is also configured to, in some embodiments, to determine the location of the user and/or first participant or the locations of the devices of the user and/or of first participant. This location information can be used to compare the various locations of the participants as discussed in more detail below.

Areas of expertise of the second participant can be based on the background, education, number of years of experience, job title, licenses, training, and/or types of experience associated with the second participant. Generally, the area of expertise of the second participant can be used to determine if the second participant is qualified or likely to be of assistance to the user. The area of expertise can also be used to compare the second participants to other potential participants. For example, if the system of method 300 determines that another participant is more qualified to interact with the user or answer the user's questions, the system of method 300 may substitute the second participant with the more qualified participant or suggest the other participant to the user. In cases where the second participant is not known or identified by the user and/or first participant, the areas of expertise can be used to identify or recommend participants having the areas of expertise provided in the request. For example, the user may want a second opinion about a certain subject and may request that a second participant having knowledge about the certain subject be recommended.

As illustrated in block 308, a determination that the second participant is authorized to join the video conference based on the credentials is made. The system of method 300, in some embodiments, identifies the second participant based on the credentials. For example, the system of method 300 may verify the credentials of the second participant, such as security code and IP address submitted by the user and/or first participant are correct. In another example, the user and/or first participant may be unable to identify the second participant, but may still include a second topic of interest to the user or desired area of expertise in the request. In such cases, the system of method 300 may compare the credentials and/or second topic of interest with a database of authorized or registered participants to identify a second participant that is authorized and/or qualified.

In some embodiments, the system of method 300 compares the credential to a list of authorized participants to determine that the second participant is authorized to join the video conference. For example, the list of authorized participants may include individuals that have interacted with the user in a video conference in the past six months, employees of a financial institution that have been cleared to participate in customer service video conferences, bank associates having certain employee numbers, individuals having certain training, registered participants, and the like.

In additional embodiments, determining that the second participant is authorized to join the video conference is based on one or more rules. For example, the one or more rules may require that the user or first participant provide a security code to fulfill the request of adding the second participant to the video conference. The user or first participant may be prompted to input a security code such as a PIN in a pop-up window when submitting the request. In another example, the one or more rules may use the identifier of the second participant such as an employee number or user name to identify the second participant and compare the second participant with a list of authorized participants. The list of authorized participants can be defined by user or default preferences for authorized financial institution associates such as the types of work experience, number of years of work experience, past interaction with the user, geographical location, and the like. The list of authorized participants may also include participants who share a financial obligation or asset with the user (e.g., a co-signer to a loan, a joint account owner), family members of the participant, agents of the user, third party financial advisors, and the like.

In exemplarily embodiments, the system of method 300 determines that the second participant is authorized to join the video conference based on the geographical location of the user, first participant, and/or second participant. For example, the system of method 300 may determine the location of the user, first participant, and/or the second participant and compare two or more of the locations. In one example, the system of method 300 determines the distance between the user, first participant and/or the second participant and uses the distance to determine whether the second participant is authorized to join the video conference. The distance may be a range such as 0 to 30 feet in cases where the second participant must be in the same room or in a close proximity to the user or the user's device in order to be authorized to join the video conference. For example, the system of method 300 may determine that the second participant is sitting next to the user based on the video data and/or audio data of the video conference. In such cases, the system of method 300 may be configured to automatically connect the device of the second participant to the video conference. The user may prefer to only talk to financial institution associates that are at the same location as the first participant. The user may also prefer to only video conference with financial institution associates located close by to the user or within a specific town of state. For example, the system of method 300 may determine authorization only in instances where the location of the second participant is within a 50 mile radius of the user's current location or a location designated by the user such as the user's home address.

In other embodiments, the system of method 300 may also notify the user, first participant, and/or second participant of an unauthorized participant based on the audio and/or video data of the video conference. For example, in situations where the user is in a semi-private or public setting, the system of method 300 may notify the user that other people are located nearby when video or audio of non-authorized individuals are detected. For example, an unknown participant may be close enough to the user's device such that the user's device is able to pick up the unknown participant's voice or capture the unknown participant on the device' camera. In such cases, the system of method 300 may prompt the user to confirm that the notification was received, prompt the user to move to a more secluded location, or prompt the user to terminate the video conference.

In still other embodiments, the second participant is automatically connected to the video conference in response to receiving the request. For example, default or user preferences may allow all participants that are requested by the user to be automatically connected to the video conference. Additional participants that are known to the user, for example, may be automatically connected to the video conference or not require as many precautionary steps as additional participants that are unknown to the user.

As illustrated at block 310, the second participant is connected to the video conference. Although a three participant video conference is described herein, it will be understood that the video conference may include any number of participants. In exemplary embodiments, the second participant shares the device of the user and/or first participant.

As illustrated at block 312, a log is provided to the second participant. The log includes video conference data. For example, the log may include at least some of the video data, audio data, and/or textual data associated with the video conference that was generated up until the second participant joined the video conference, such as a video recording, audio recording, or text transcript of dialogue between the user and the first participant. As another example, the log may also include data generated in previous video conferences of the user, including video conferences that occurred on a different date and/or time as the current video conference. The log may also include documents (e.g., contracts, polices, offers, etc.), accounts, pictures, and any other data discussed or viewed during the video conference. Other exemplary log information includes summaries of what had been previously discussed between the user and first participant, a first topic of interest to the user, a second topic of interest to the user, the reason why the second participant is participating in the video conferences, and the like. The log, in some embodiments, is presented on the display of the device of the second participant. The log may be on the same graphical user interface as the video conference. For example, the log may appear in a corner of the screen for the video conference. The log, in other instances, may be presented to the second participant on a graphical user interface that is separate from the video conference screen. For example, the log may be sent to the second participant via text or email. In other embodiments, the log is presented to the second participant before the second participant is connected to the video conference. The second participant may be, for example, required to affirm that he or she reviewed the log prior to being connected to the video conference.

Referring now to FIG. 3B, the system and method 300 is further illustrated. As illustrated at block 320, a determination is made that the user has been disconnected from the video conference. For example, the device of the user may cease to be in direct or indirect connection with the devices of the other participants, the device of the user may have stopped receiving or transmitting video and/or audio data, or the quality of the transmitted video and/or audio data may be poor. In other examples, the device of the user may still be connected to the video conference, but the user herself may be unresponsive, not visible or audible to the other participants, or not in control of her device.

In response to the determination in block 320, the video conference is terminated, the user, first participant, and/or second participant is notified; the user, first participant, and/or second participant is prompted to take action; and/or the user is reconnected to the video conference as illustrated at block 322. The user or other participants may be unaware that the user or some other participant is disconnected from the video conference. The system of method 300 may send a text, email, of display a pop-up window on the devices of the user or other participants to notify them that the user or other participants are disconnected from the video conference. The system of method 300, in some embodiments, is configured to prompt the first participant to cease communications with any remaining participants. For example, a customer service representative may be prompted to close all open documents or presentations, stop talking, and/or mute the audio feed in response to determining that the user is disconnected from the video conference. In other embodiments, the system of method 300 is configured to automatically terminate at least a portion of the video conference. For example, the system of method 300 may be configured to disconnect the second participant, but allow the first participant to remain in the video conference until the user is reconnected to the video conference. The system of method 300 is configured to reconnect the user by reestablishing the transmission of video and/or audio data between the devices of the first and/or second participant, improving the quality of the transmission, and/or receiving an affirmation from the user that she is connected to the video conference.

As illustrated in blocks 330 and 332, the second participant is identified based on the credentials and an invitation to join the video conference is sent to the second participant. For example, the second participant may be sent a text or email with a link to a website for connecting to the video conference and/or a username and password. The second participant may be prompted to download a mobile application or may be taken directly to a website for connecting to the video conference.

As illustrated in block 334, input is received from the second participant where the input includes the security code, the identifier, and contact data. In other embodiments, the input comprises an additional security code that is different from the first security code. For example, if the first security code provided in the request is a security code associated with the user and/or first participant, the second participant may provide his or her own PIN and not the first security code. As another example, the second participant may be required to undergo a registration process. The second participant may be prompted to provide his or her name, address, phone number, IP address of the device he or she is using to connect to the video conference, user name, password, and the like.

As illustrated in block 340, the user is prompted to confirm that the second participant is authorized to join the video conference. For example, the user may check a box on the display of the user's device; input a PIN to confirm the authorization, and the like. As illustrated in block 342, the system of method 300 is configured to receive confirmation from the user where the second participant is connected to the video conference in response to receiving the confirmation.

Turning now to FIG. 4, a flow chart of a system and method 400 for initiating a multiple-participant video conference is illustrated. One or more devices, such as one or more mobile devices and/or one or more other computing devices and/or servers, can be configured to perform one or more steps of the method 300 (e.g., device associated with the financial institution system 240, devices associated with the financial institution representative system 260, and the customer device 210 of FIG. 2). In some embodiments, the one or more devices performing the steps are associated with a financial institution. In other embodiments, the one or more devices performing the steps are associated with a business, partner, third party, and/or user.

As illustrated in block 402, a list of suggested subjects is provided to the user. FIG. 5 illustrates a graphical user interface (GUI) 500 of a FAQ section of a user's online banking account on a display of the user's device 502 (e.g., the customer device 210). The GUI 500 allows the user to access a FAQ section that includes answers to questions and information related to a particular subject. If the user cannot find an answer to a question, needs further explanation, or wants to take action, the user may then select the "Contact Banker" icon on the left hand side of the GUI 500 to open GUI 600 of FIG. 6.

FIG. 6 illustrates a GUI 600 a Contact Banker section of the user's online banking account. In some embodiments, each of the suggested subjects comprises one or more sub-topics. For example, as illustrated in FIG. 6, the "Credit Card" subject is further divided into a new credit card, card offering, and lost or stolen credit card sub-topics. The sub-topics may be divided into categories. For example, the new credit card sub-topic may further include specific types of cards.

Referring again to FIG. 4, at block 404, a subject of interest to the user selected from the list of suggested subjects is received. The user can, for example, select a "Loans" subject as shown in FIG. 6. As illustrated in the GUI 700 of FIG. 7, the user chooses a sub-topic of "Auto." In some embodiments, the system of method 400 is configured to identify experts on the subject of interest to the user. For example, the system of method 400 may search a database to identify financial institution associates that have job titles, work experience, training or job/duty descriptions that are associated with the selected subject or that belong to a particular department that handle cases related to the selected subject.

As illustrated at block 406 of FIG. 4, a list of one or more experts on the subject of interest to the user is provided. Various different experts 710 are provided to the user as shown in FIG. 7. The list of experts in the GUI 700 includes a picture of each of the loan experts 710. Further, a descriptive outline associated with each of the loan experts 710. The descriptive outline may include, for example, a description of the expert's specialties, the work address, email address, telephone number or extension number, years of experience, training, education, and the like.

As illustrated at block 408 of FIG. 4, the system of method 400 is configured to receive, from the user, input to initiate a video conference with a first participant selected from the list of one or more experts. The GUI 700 of FIG. 7 shows the user moving the cursor to one of the loan experts 710 and clicking on that one expert's picture to select that expert.

As illustrated at block 410, and as previously discussed with respect to FIG. 3A, the system of method 400 initiates the video conference between the user and the first participant. FIG. 8 illustrates a GUI 800 of a video conference between "Associate 1" and "User 1." As further illustrated, User 1 and Associate 1 can both view a document and make changes to the document being discussed.

As illustrated at block 412 of FIG. 4 and as previously discussed with respect to FIG. 3A, a request to add at least a second participant to the video conference is recived from the user and/or the first participant, the request comprising credentials associated with the second participant, the credentials comprising a security code, an identifier of the second participant or the device of the second participant, the geographical location of the second participant, and/or an area of expertise of the second participant.

In some embodiments, the request comprises a second topic of interest to the user. The system of method 400 may identify experts or other participants and provide a list of suggested experts or other participants to the user and/or first participant. The user and/or first participant may then select the second participant from the list of suggested experts or other participants. In one example, the user may desire to open a new account or set up a bill pay option for a new car loan. In such cases, the user may prefer that a family member, an outside financial planner, or another expert be brought into the video conference.

As illustrated in blocks 414 and 416 of FIG. 4 and as previously discussed with respect to FIG. 3A, it is determined that the second participant is authorized to join the video conference based on the credentials and the second participant is connected to the video conference.

FIG. 9 illustrates a GUI 900 of a video conference. In the illustrated embodiment, the participants include Associate 1, Associate 2, User 1, and User 2. Associate 1 is the loan expert selected by User 1, Associate 2 is another expert selected by User 1 or Associate 1, and User 2 is a family member, outside expert, agent, and the like. In some cases, the information that Associate 2 and User 2 can see or control, such as the loan document in GUI 900, may be limited. For example, User 2 and Associate 2 may be able to view the loan document in GUI 900, but may not be able to make any changes to the document.

In various embodiments, a private "share screen" widget may be presented between customers. This private screen may not be visible to the representative. For example, a customer and the customer's spouse may be in a three-way conversation with a representative and can compare notes or information with one another without the representative receiving the information on the representative's screen. As a specific example, this information may include sharing of the customers' chat or other text as well as document sharing in some cases.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

This application incorporates by reference in their entirety each of the following applications filed concurrently herewith:

U.S. application Ser. No. 13/651,966, entitled SYSTEM PROVIDING AN INTERACTIVE CONFERENCE filed Oct. 15, 2012 to Matt Calman et al.;

U.S. application Ser. No. 13/652,120, entitled PROVIDING A RECORD OF AN INTERACTIVE CONFERENCE, filed Oct. 15, 2012 to Matt Calman et al.;

U.S. application Ser. No. 13/651,798, entitled ADAPTIVE SCAFFOLDING OF LEVELS OF CONNECTIVITY DURING A CONFERENCE, filed Oct. 15, 2012 to Matt Calman et al.;

U.S. application Ser. No. 13/651,674, entitled FUNCTIONALITY DURING A HOLD PERIOD PRIOR TO A CUSTOMER SERVICE VIDEO CONFERENCE filed Oct. 15, 2012 to Matt Calman et al.;

U.S. application Ser. No. 13/651,970, entitled SPLIT-SCREEN PRESENTATION OF FUNCTIONALITY DURING A HOLD PERIOD PRIOR TO A CUSTOMER SERVICE VIDEO CONFERENCE, filed Oct. 15, 2012 to Matt Calman et al.;

U.S. application Ser. No. 13/652,093, entitled REPRESENTATIVE SELECTION FOR CUSTOMER SERVICE CONFERENCE, filed Oct. 15, 2012 to Matt Calman et al.; and U.S. application Ser. No. 13/652,175, entitled REPRESENTATIVE PRE-SELECTION FOR CUSTOMER SERVICE CONFERENCE, filed Oct. 15, 2012 to Matt Calman et al.

What is claimed is:

1. A system for initiating a multiple-participant video conference, the system comprising:
   a computer apparatus including a processor and a memory; and
   a conference module stored in the memory, comprising executable instructions that when executed by the processor cause the processor to:
      receive input to initiate a video conference with a first participant from a user;
      initiate the video conference between the user and the first participant;
      record a log of the video conference, the log comprising a text transcript of dialogue between the user and the first participant;
      provide, on a display of a device of the user that is in communication with the system, a list of suggested subjects to the user;
      receive the subject of interest to the user selected from the list of suggested subjects;
      share a document between the user and the first participant via the video conference;
      provide, on the display of the device, a list of one or more experts on a subject of interest to the user;
      receive a request to add at least a second participant to the video conference from at least one of the user and the first participant, the request comprising credentials associated with the second participant, wherein the second participant comprises an expert selected from the list of one or more experts;
      determine that the second participant is authorized to join the video conference based on the credentials;
      connect the second participant to the video conference;
      determine financial documents associated with the user and the subject of interest; and
      provide the log of the video conference and the documents to the second participant.

2. The system of claim 1, wherein the credentials comprise at least one of a security code, an identifier of the second participant, an identifier associated with the device of the second participant that is in communication with the system, a geographical location of the second participant, and an area of expertise of the second participant.

3. The system of claim 2, wherein the module is further configured to:
   identify the second participant based on the credentials;
   match the second participant to a participant on a list of authorized participants.

4. The system of claim 2, wherein the module is further configured to:
   determine that a geographical location of the second participant is within a predetermined distance of the geographical location of the device of the user.

5. The system of claim 1, wherein the module is further configured to:
   prompt the user to confirm that the second participant is authorized to join the video conference; and
   receive confirmation from the user,
   wherein the second participant is connected to the video conference in response to receiving the confirmation from the user.

6. The system of claim 1, wherein the module is further configured to:
   determine that the user has been disconnected from the video conference.

7. The system of claim 6, wherein the module is further configured to:
   automatically terminate the video conference call for all participants.

8. The system of claim 6, wherein the module is further configured to:
   prompt the first participant to cease communications with the second participant until the user has been reconnected to the video conference.

9. The system of claim 1, wherein the second participant comprises at least one of an expert on a second subject of interest to the user, a family member of the user, a joint account holder of the user, a financial planner, and an agent of the user.

10. A computer program product for initiating a multiple-participant video conference, the computer program product comprising:
   a non-transitory computer readable storage medium having computer readable program code embodied therewith, the computer readable program code comprising:
   a computer readable program code configured to receive input to initiate a video conference with a first participant from a user;
   a computer readable program code configured to initiate the video conference between the user and the first participant;
   a computer readable program code configured to record a log of the video conference, the log comprising a text transcript of dialogue between the user and the first participant;
   a computer readable program code configured to provide, on a display of a device of the user that is in communication with the system, a list of suggested subjects to the user;
   a computer readable program code configured to receive the subject of interest to the user selected from the list of suggested subjects;
   a computer readable program code configured to share a document between the user and the first participant via the video conference;
   a computer readable program code configured to provide, on the display of the device, a list of one or more experts on a subject of interest to the user;
   a computer readable program code configured to receive a request to add at least a second participant to the video conference from at least one of the user and the first participant, the request comprising credentials associated with the second participant;

a computer readable program code configured to determine that the second participant is authorized to join the video conference based on the credentials;

a computer readable program code configured to connect the second participant to the video conference a computer readable program code configured to determine financial documents associated with the user and the subject of interest; and a computer readable program code configured to provide the log of the video conference and the documents to the second participant.

11. The computer program product of claim 10, wherein the credentials comprise at least one of a security code, an identifier of the second participant, an identifier associated with the device of the second participant, a geographical location of the second participant, and an area of expertise of the second participant.

12. The computer program product of claim 10, further comprising computer readable program code configured to:
prompt the user to confirm that the second participant is authorized to join the video conference; and
receive confirmation from the user,
wherein the second participant is connected to the video conference in response to receiving the confirmation from the user.

13. A computer implemented method for initiating multiple-participant video conferencing, the method comprising:
receiving input to initiate a video conference with a first participant from a user;
initiating, via a computing the video conference between the user and the first participant;
recording, via the computing device processor, a log of the video conference, the log comprising a text transcript of dialogue between the user and the first participant;
providing, on a display of a device of the user that is in communication with the system, a list of suggested subjects to the user;
receiving the subject of interest to the user selected from the list of suggested subjects;
sharing, via the computing device processor, a document between the user and the first participant via the video conference;
providing, on the display of the device, a list of one or more experts on a subject of interest to the user;
receiving a request to add at least a second participant to the video conference from at least one of the user and the first participant, the request comprising credentials associated with the second participant;
determining that the second participant is authorized to join the video conference based on the credentials;
connecting the second participant to the video conference
determining, via the computing device processor, financial documents associated with the user and the subject of interest; and
providing the log of the video conference and the documents to the second participant.

14. The method of claim 13, wherein the credentials comprise at least one of a security code, an identifier of the second participant, an identifier associated with the device of the second participant, a geographical location of the second participant, and an area of expertise of the second participant.

\* \* \* \* \*